(12) United States Patent
Jian

(10) Patent No.: US 10,944,956 B2
(45) Date of Patent: Mar. 9, 2021

(54) IMAGE CALIBRATION METHOD AND APPARATUS APPLIED TO THREE-DIMENSIONAL CAMERA

(71) Applicant: AUTEL ROBOTICS CO., LTD., Guangdong (CN)

(72) Inventor: Yupeng Jian, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 16/740,152

(22) Filed: Jan. 10, 2020

(65) Prior Publication Data

US 2020/0267373 A1  Aug. 20, 2020

Related U.S. Application Data

(63) Continuation of application No. PCT/CN2018/083761, filed on Apr. 19, 2018.

(30) Foreign Application Priority Data

Jul. 11, 2017  (CN) .......................... 201710561888.X

(51) Int. Cl.
*H04N 13/246* (2018.01)
*H04N 13/271* (2018.01)

(52) U.S. Cl.
CPC ......... *H04N 13/246* (2018.05); *H04N 13/271* (2018.05)

(58) Field of Classification Search
CPC ........................... H04N 13/246; H04N 13/271
See application file for complete search history.

(56) References Cited

U.S. PATENT DOCUMENTS 6,377,298 B1 * 4/2002 Scheele ............... H04N 17/002
348/187
6,421,629 B1 * 7/2002 Ishiyama ............. G01B 11/255
702/159

(Continued)

FOREIGN PATENT DOCUMENTS

CN   102722080 A   10/2012
CN   103581648 A    2/2014
(Continued)

OTHER PUBLICATIONS

International Search Report dated Jul. 18, 2018; PCT/CN2018/083761.

(Continued)

*Primary Examiner* — Brian P Yenke

(57) ABSTRACT

The present invention discloses an image calibration method and apparatus applied to a three-dimensional camera. The method includes: photographing a to-be-tested object by using the three-dimensional camera, obtaining an image of the to-be-tested object in a photosensitive area of the three-dimensional camera, and determining a pixel point corresponding to the to-be-tested object in the photosensitive area according to the image of the to-be-tested object; obtaining, for the pixel point of the to-be-tested object, depth information corresponding to the pixel point, the depth information indicating a distance between the to-be-tested object and the pixel point; and obtaining a measurement deviation value corresponding to the pixel point from a measurement deviation set stored in advance, and correcting the depth information according to the measurement deviation value. Therefore, the image of the to-be-tested object obtained by the three-dimensional camera is calibrated by correcting the depth information of the to-be-tested object corresponding (Continued)

to the pixel point, to eliminate a distortion generated in the image of the to-be-tested object.

9 Claims, 9 Drawing Sheets

(56) References Cited

U.S. PATENT DOCUMENTS

| | | | |
|---|---|---|---|
| 8,588,515 B2* | 11/2013 | Bang | G06T 5/50 |
| | | | 382/154 |
| 9,792,719 B2* | 10/2017 | Hyllus | G06T 15/005 |
| 10,298,912 B2* | 5/2019 | Kirmani | H04N 13/106 |
| 10,368,056 B2* | 7/2019 | Wang | G08B 13/19 |
| 10,523,919 B2* | 12/2019 | Cui | H04N 13/246 |
| 10,657,664 B2* | 5/2020 | Yu | G06T 15/205 |
| 2012/0098932 A1* | 4/2012 | Kim | G06T 7/593 |
| | | | 348/43 |
| 2015/0036105 A1 | 2/2015 | Ide et al. | |
| 2015/0092017 A1* | 4/2015 | Kang | G06T 5/50 |
| | | | 348/46 |
| 2016/0125637 A1* | 5/2016 | Hyllus | G06T 7/30 |
| | | | 382/154 |
| 2019/0197735 A1* | 6/2019 | Xiong | G06T 5/005 |
| 2019/0281265 A1* | 9/2019 | Zhang | H01S 5/06804 |
| 2020/0021792 A1* | 1/2020 | Amaya-Benitez | H04N 13/246 |
| 2020/0151855 A1* | 5/2020 | Jian | G06T 5/50 |

FOREIGN PATENT DOCUMENTS

| | | |
|---|---|---|
| CN | 104537627 A | 4/2015 |
| CN | 106767933 A | 5/2017 |

OTHER PUBLICATIONS

T. Kahlmann et al., "Calibration for Increased Accuracy of the Range Imaging Camera Swissranger", ISPRS Commission V Symposium "Image Engineering and Vision Metrology", Sep. 25, 2006; XP008139070; figures 15-17.

Marvin Lindner, et al; "Lateral and Depth Calibration of PMD-Distancee Sensors", Advances in Visual Computing Lecture Notes in Computer Science; LNCS, Springer, Berlin, DE, pp. 524-533 XP019050872; Jan. 1, 2006.

Extended European Search Report dated May 12, 2020; Appln. No. 18832958.5.

* cited by examiner

IMAGE CALIBRATION METHOD AND APPARATUS APPLIED TO THREE-DIMENSIONAL CAMERA

This application is a continuation application of International Application No. PCT/CN2018/083761, filed on Apr. 19, 2018, which claims priority of Chinese Patent Application. No. 201710561888.X, filed on Jul. 11, 2017, which is incorporated herein by reference in its entirety.

BACKGROUND

Technical Field

The disclosure relates to the field of image sensor application technologies, and in particular, to an image calibration method and apparatus applied to a three-dimensional camera.

Related Art

With the development of image sensor technologies, three-dimensional cameras have been increasingly widely used. The three-dimensional camera emits modulated near-infrared light or laser through modulated light source, the modulated near-infrared light or laser being reflected when encountering a to-be-tested object. Distance information of the to-be-tested object can be obtained by calculating a time difference or a phase difference of the emitted light and the reflected light propagating between the three-dimensional camera and the to-be-tested object.

In the prior art, a three-dimensional camera based on the Time of Flight (TOF) technology is used to photograph the to-be-tested object, and a distance of the to-be-tested object is calculated by using a time difference or a phase difference of propagation of a frequency-modulated light pulse, that is, an image of the to-be-tested object obtained by the three-dimensional camera substantially indicates a distance between the to-be-tested object and the three-dimensional camera.

However, because a photosensitive area of the three-dimensional camera is a pixel matrix composed of image sensors, and a distance between a pixel point located in a marginal area of the photosensitive area and the to-be-tested object is not completely the same as a distance between a pixel point located in a center area of the photosensitive area and the to-be-tested object, which leads to a certain degree of distortion in the image of the to-be-tested object obtained by the three-dimensional camera.

SUMMARY

In order to resolve a technical problem that an image of a to-be-tested object obtained by a three-dimensional camera is distorted to some extent in the related technology, embodiments of the present invention provide an image calibration method and apparatus applied to a three-dimensional camera.

An image calibration method applied to a three-dimensional camera, where the method includes:

photographing a to-be-tested object by using the three-dimensional camera, obtaining an image of the to-be-tested object in a photosensitive area of the three-dimensional camera, and determining a pixel point corresponding to the to-be-tested object in the photosensitive area according to the image of the to-be-tested object;

obtaining, for the pixel point corresponding to the to-be-tested object, depth information corresponding to the pixel point, the depth information indicating a distance between the to-be-tested object and the pixel point; and obtaining a measurement deviation value corresponding to the pixel point from a measurement deviation set stored in advance, and correcting the depth information according to the measurement deviation value.

In one of the exemplary embodiments, the obtaining, for the pixel point of the to-be-tested object, depth information corresponding to the pixel point includes:

calculating a phase difference of preset modulated light propagating between the pixel point and the to-be-tested object, and using the calculated phase difference as the depth information corresponding to the pixel point.

In one of the exemplary embodiments, before the obtaining a measurement deviation value corresponding to the pixel point from a measurement deviation set stored in advance, the method further includes:

selecting a reference area from the photosensitive area, and calculating an average reference phase difference according to a reference phase difference corresponding to each reference pixel point in the reference area, the reference phase difference indicating a reference distance between a preset reflective surface and the reference pixel point;

calculating, according to a target distance between a target pixel point in the photosensitive area and the preset reflective surface, a target phase difference corresponding to the target pixel point, the target pixel point being any pixel point among all pixel points in the photosensitive area;

comparing the obtained target phase difference with the average reference phase difference to obtain a measurement deviation value corresponding to the target pixel point; and storing the measurement deviation value corresponding to the target pixel point into the measurement deviation set.

In one of the exemplary embodiments, the calculating an average reference phase difference according to a reference phase difference corresponding to each reference pixel point in the reference area includes:

calculating a phase difference of preset modulated light propagating between each reference pixel point and the preset reflective surface, to obtain a reference phase difference corresponding to each reference pixel point; and calculating an average reference phase difference corresponding to all reference pixel points in the reference area according to the reference phase difference corresponding to each reference pixel point in the reference area.

In one of the exemplary embodiments, before the calculating, according to a target distance between a target pixel point in the photosensitive area and the preset reflective surface, a target phase difference corresponding to the target pixel point, the method further includes:

determining, according to a pixel distance between the target pixel point and a center reference point, a field of view corresponding to the pixel distance, the center reference point indicating a reference pixel point at a center position of the reference area; and calculating the target distance between the target pixel point and the preset reflective surface according to the field of view and a reference distance between the center reference point and the preset reflective surface.

In one of the exemplary embodiments, the determining, according to a pixel distance between the target pixel point and a center reference point, a field of view corresponding to the pixel distance includes:

calculating a unit field of view between adjacent pixel points in the photosensitive area; and calculating the field of view corresponding to the pixel distance according to the pixel distance and the unit field of view.

An image calibration apparatus applied to a three-dimensional camera, where the apparatus includes:

an imaging module, configured to photograph a to-be-tested object by using the three-dimensional camera, obtain an image of the to-be-tested object in a photosensitive area of the three-dimensional camera, and determine a pixel point corresponding to the to-be-tested object in the photosensitive area according to the image of the to-be-tested object;

an obtaining module, configured to obtain, for the pixel point corresponding to the to-be-tested object, depth information corresponding to the pixel point, the depth information indicating a distance between the to-be-tested object and the pixel point; and a correction module, configured to obtain a measurement deviation value corresponding to the pixel point from a measurement deviation set stored in advance, and correct the depth information according to the measurement deviation value.

In one of the exemplary embodiments, the apparatus further includes:

a calculation module, configured to calculate a phase difference of preset modulated light propagating between the pixel point and the to-be-tested object, and use the calculated phase difference as the depth information corresponding to the pixel point.

In one of the exemplary embodiments, the apparatus further includes:

an average reference phase difference obtaining module, configured to select a reference area from the photosensitive area, and calculate an average reference phase difference according to a reference phase difference corresponding to each reference pixel point in the reference area, the reference phase difference indicating a reference distance between a preset reflective surface and the reference pixel point;

a target phase difference obtaining module, configured to calculate, according to a target distance between a target pixel point in the photosensitive area and the preset reflective surface, a target phase difference corresponding to the target pixel point, the target pixel point being any pixel point among all pixel points in the photosensitive area;

a comparison module, configured to compare the obtained target phase difference with the average reference phase difference to obtain a measurement deviation value corresponding to the target pixel point; and a storage module, configured to store the measurement deviation value corresponding to the target pixel point into the measurement deviation set.

In one of the exemplary embodiments, the average reference phase difference obtaining module is specifically configured to:

calculate a phase difference of preset modulated light propagating between each reference pixel point and the preset reflective surface, to obtain a reference phase difference corresponding to each reference pixel point; and calculate an average reference phase difference corresponding to all reference pixel points in the reference area according to the reference phase difference corresponding to each reference pixel point in the reference area.

In one of the exemplary embodiments, the apparatus further includes:

a field-of-view calculation module, configured to determine, according to a pixel distance between the target pixel point and a center reference point, a field of view corresponding to the pixel distance, the center reference point indicating a reference pixel point at a center position of the reference area; and a target distance calculation module, configured to calculate the target distance between the target pixel point and the preset reflective surface according to the field of view and a reference distance between the center reference point and the preset reflective surface.

In one of the exemplary embodiments, the field-of-view calculation module further includes:

a unit field-of-view calculation element, configured to calculate and obtain a unit field of view between adjacent pixel points in the photosensitive area; and a field-of-view calculation element, configured to calculate the field of view corresponding to the pixel distance according to the pixel distance and the unit field of view.

An image calibration apparatus applied to a three-dimensional camera, including: at least one processor; and a memory communicatively connected to the at least one processor, where the memory stores an instruction executable by the at least one processor, and the instruction is executed by the at least one processor, so that the at least one processor performs the foregoing image calibration method applied to a three-dimensional camera.

The technical solutions provided by the embodiments disclosed in the present invention can include the following beneficial effects: A to-be-tested object is photographed by using a three-dimensional camera, an image of the to-be-tested object is obtained in a photosensitive area of the three-dimensional camera, and a pixel point corresponding to the to-be-tested object in the photosensitive area is determined according to the image of the to-be-tested object. For the pixel point corresponding to the to-be-tested object, depth information corresponding to the pixel point is obtained, the depth information indicating a distance between the to-be-tested object and the pixel point. A measurement deviation value corresponding to the pixel point is obtained from a measurement deviation set stored in advance, and the depth information is corrected according to the measurement deviation value. Therefore, the image of the to-be-tested object obtained by the three-dimensional camera is calibrated by correcting the depth information of the to-be-tested object corresponding to the pixel point, to eliminate a distortion generated in the image of the to-be-tested object.

It should be understood that the above general descriptions and the following detailed descriptions are merely exemplary, and cannot limit the present disclosure.

BRIEF DESCRIPTION OF THE DRAWINGS

The accompanying drawings, which are incorporated herein and constitute a part of this specification, illustrate embodiments consistent with the present invention and, together with the description, serve to explain the principles of the present invention. The accompanying drawings for illustrating the embodiments or the existing technology will be introduced briefly in the below. Apparently, the drawings in the following description are only some embodiments of the present invention, and a person of ordinary skill in the art may obtain drawings of other embodiments based on these accompanying drawings without creative efforts.

DETAILED DESCRIPTION

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. Implementations described in the following exemplary embodiments do not represent all implementations consisting with the present invention. On the contrary, the implementations described herein are merely examples of the apparatus and method that are described in claims in detail and that are consistent with some aspects of the present disclosure.

Figure 1:
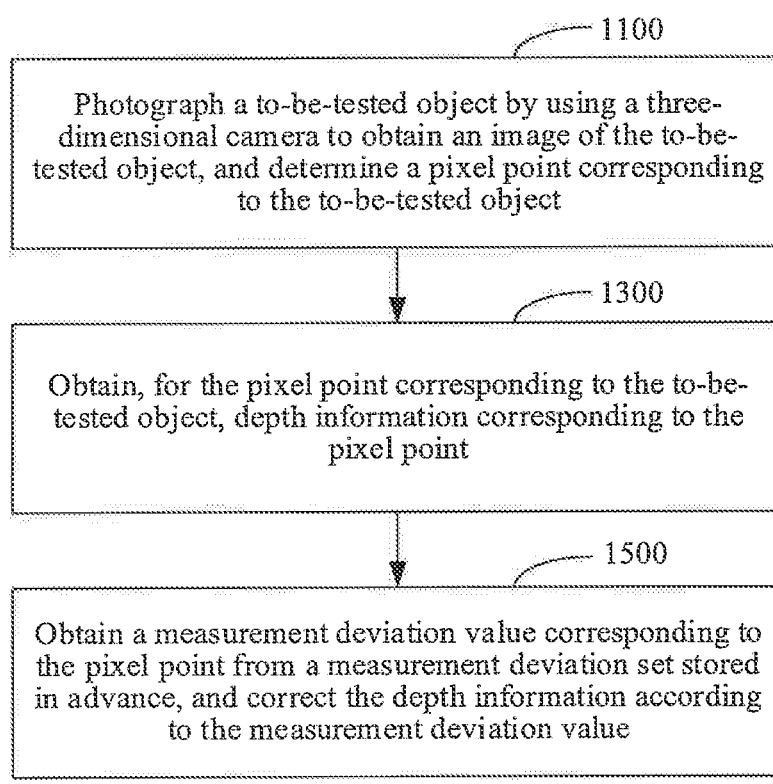
FIG. 1 is a flowchart of an image calibration method applied to a three-dimensional camera according to an exemplary embodiment.

FIG. 1 is a flowchart of an image calibration method applied to a three-dimensional camera according to an exemplary embodiment. As shown in FIG. 1, the method includes but is not limited to the following steps:

In step 1100, a to-be-tested object is photographed by using a three-dimensional camera, an image of the to-be-tested object is obtained in a photosensitive area of the three-dimensional camera, and a pixel point corresponding to the to-be-tested object in the photosensitive area is determined according to the image of the to-be-tested object.

The three-dimensional camera is a camera that photographs a to-be-tested object and obtains an image of the to-be-tested object by using image sensor technologies. The three-dimensional camera emits modulated near-infrared light or laser, the modulated near-infrared light or laser being reflected when encountering a to-be-tested object. Distance information of the to-be-tested object can be obtained by calculating a time difference or a phase difference of the emitted light and the reflected light propagating between the three-dimensional camera and the to-be-tested object.

The photosensitive area is an area used for photographic imaging of the to-be-tested object in the three-dimensional camera, the photosensitive area being composed of a pixel matrix of image sensors. For example, the image sensor includes a CCD photoelectric sensor, a CMOS photoelectric sensor and the like.

Specifically, the to-be-tested object is photographed by the three-dimensional camera. Preset modulated light is emitted by a modulated light source, the preset modulated light being reflected by the to-be-tested object to the photosensitive area of the three-dimensional camera. The image of the to-be-tested object is obtained in the photosensitive area of the three-dimensional camera, so that a pixel point corresponding to the to-be-tested object in the photosensitive area can be further determined through the image of the to-be-tested object. The preset modulated light is near-infrared light or laser light modulated by different modulation frequencies.

It is to be noted that, the pixel points corresponding to the to-be-tested object which are determined based on the image of the to-be-tested object are only a part of all pixel points in the photosensitive area, so that pixel points for subsequent image calibration are also only the part of pixel points related to the to-be-tested object.

In step 1300, for the pixel point corresponding to the to-be-tested object, depth information corresponding to the pixel point is obtained.

The depth information is distance information of the to-be-tested object represented by the image of the to-be-tested object in the photosensitive area of the three-dimensional camera, that is, the depth information indicates a distance between the to-be-tested object and the pixel point corresponding to the to-be-tested object.

The image of the to-be-tested object obtained by the three-dimensional camera based on the TOF technology is capable of reflecting a distance between the to-be-tested object and the three-dimensional camera. Different distances are represented in different colors to record and express the depth information of the pixel point corresponding to the to-be-tested object. Therefore, the depth information corresponding to the pixel point can be obtained through the image of the to-be-tested object.

Furthermore, a time difference or a phase difference of the preset modulated light propagating between the pixel point in the photosensitive area and the to-be-tested object is calculated, so that the calculated time difference or phase difference is used as the depth information corresponding to the pixel point.

In step 1500, a measurement deviation value corresponding to the pixel point is obtained from a measurement deviation set stored in advance, and the depth information is corrected according to the measurement deviation value.

The measurement deviation set includes measurement deviation values corresponding to a plurality of pixel points, the measurement deviation value reflecting a distance deviation between the pixel point in a marginal area of the photosensitive area and the to-be-tested object and a distance deviation between the pixel point in a center area of the photosensitive area and the to-be-tested object.

Furthermore, the measurement deviation set is stored in a storage medium of the three-dimensional camera in advance. For example, the storage medium includes a read-only memory, a random memory, a flash memory and the like.

Furthermore, the measurement deviation set of the three-dimensional camera is different according to different modulation frequencies of the preset modulated light. Therefore, when the depth information is corrected by using the measurement deviation value corresponding to each pixel point obtained from the measurement deviation set stored in advance, measurement deviation values in the measurement deviation set corresponding to the modulation frequency should be read.

Therefore, after the three-dimensional camera photographs the to-be-tested object and an image of the to-be-tested object is obtained, the image can be calibrated by reading the measurement deviation value in the measurement deviation set in the storage medium, that is, the depth information is corrected according to the measurement deviation value, so that the distance deviation between the pixel point of the marginal area in the photosensitive area and the to-be-tested object is roughly the same as the distance deviation between the pixel point in the center area of the photosensitive area and the to-be-tested object, thereby avoiding a distortion generated in the image of the to-be-tested object.

By the foregoing processes, the measurement deviation value corresponding to the pixel point is obtained from the measurement deviation set stored in advance, and the depth information is corrected according to the measurement deviation value. The image of the to-be-tested object obtained by the three-dimensional camera is calibrated by correcting the depth information of the to-be-tested object corresponding to the pixel point, to eliminate a distortion generated in the image of the to-be-tested object.

In an image calibration method applied to a three-dimensional camera according to an exemplary embodiment, the method further includes the following steps:

obtaining, by calculating a phase difference of preset modulated light propagating between a pixel point and a to-be-tested object, depth information corresponding to the pixel point, that is, a distance between the to-be-tested object and the pixel point.

Specifically, the distance between the to-be-tested object and the pixel point can be calculated by using the following formula:

$$D = \frac{c}{2} \times \frac{1}{2*\pi*f} \times (\pi + \varphi)$$

where $\varphi$ represents a phase difference of the preset modulated light propagating between the pixel point and the to-be-tested object, a value range of the phase difference being $-\pi \sim \pi$; D is a distance between the to-be-tested object and the pixel point; C is a speed of light; f is a frequency of the preset modulated light.

It is to be noted that, the phase difference of the preset modulated light propagating between the pixel point and the to-be-tested object is specifically a phase difference between emitted light and reflected light, the emitted light and the reflected light being generated during propagation of the preset modulated light between the pixel point and the to-be-tested object. That is, the preset modulated light is emitted by a modulated light source to the to-be-tested object to form the emitted light, and the preset modulated light is reflected by the to-be-tested object to the three-dimensional camera to form the reflected light.

Figure 2:
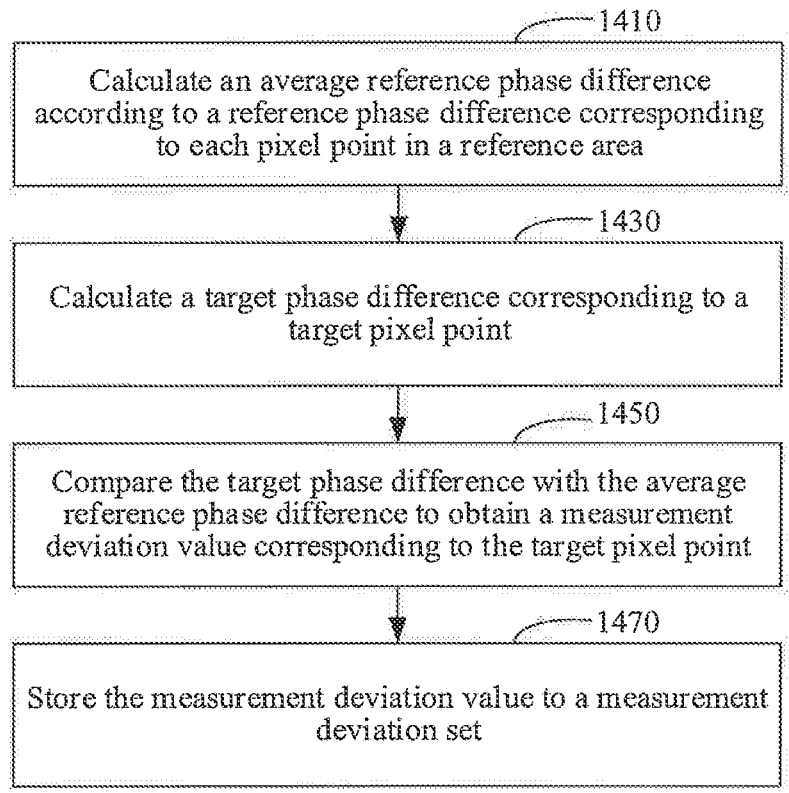
FIG. 2 is a flowchart of an image calibration method applied to a three-dimensional camera according to another exemplary embodiment.

FIG. 2 is a flowchart of an image calibration method applied to a three-dimensional camera according to another exemplary embodiment. As shown in FIG. 2, the method further includes the following steps:

In step 1410, a reference area is selected from a photosensitive area, and an average reference phase difference is calculated according to a reference phase difference corresponding to each pixel point in the reference area, the reference phase difference indicating a reference distance between a preset reflective surface and a pixel point.

Figure 5:
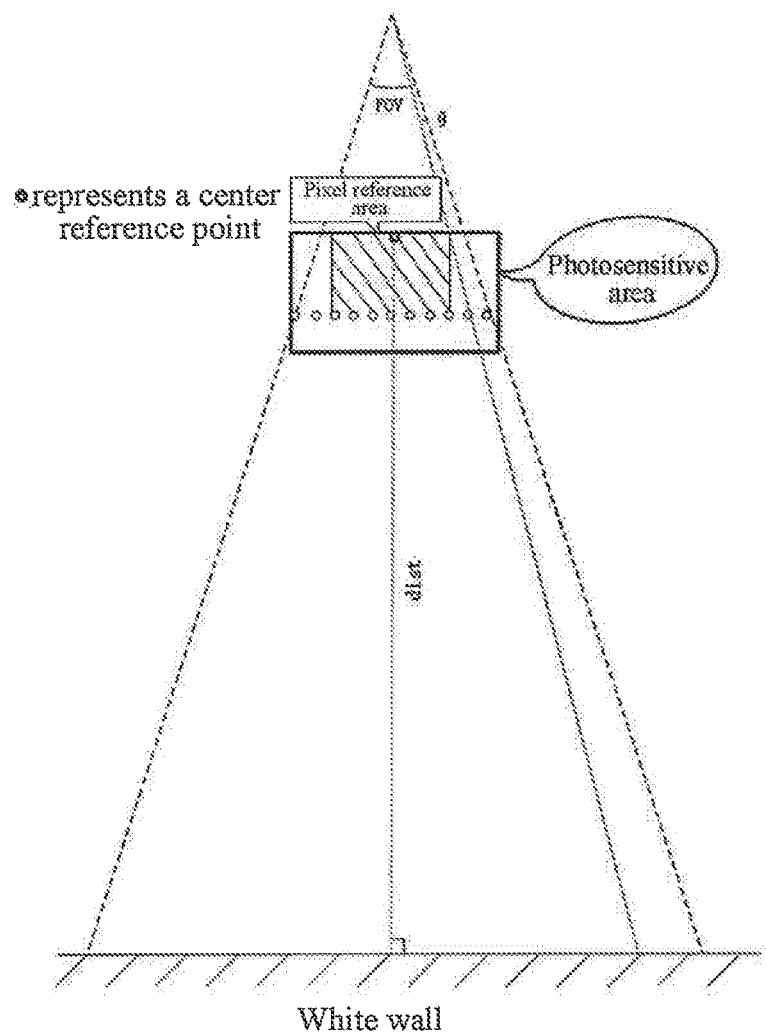
FIG. 5 is a schematic diagram of a specific implementation of selecting a reference area and setting a reference distance in an application scenario.

As shown in FIG. 5, an area at a center position in a photosensitive area is selected as a reference area, pixel points in the reference area are defined as reference pixel points, and the reference pixel point at the center position in the reference area is defined as a center reference point. A white wall is set as the preset reflective surface, dist is a reference distance between the preset reflective surface and the center reference point, and FOV (field of view) represents a field of view of the photosensitive area.

A reference phase difference corresponding to each reference pixel point is obtained by calculating a phase difference of the preset modulated light propagating between each reference pixel point and the preset reflective surface, and then an average reference phase difference corresponding to all reference pixel points in the reference area is calculated according to the reference phase difference corresponding to each reference pixel point in the reference area.

Specifically, the average reference phase difference corresponding to all the reference pixel points in the reference area can be calculated by using the following formula:

$$\mathrm{dif}f_{average}=(\Sigma_{i=1}^{k}\mathrm{phase}_i)/k.$$

where, dif $f_{average}$ represents the average reference phase difference, k is the quantity of the reference pixel points included in the reference area, and phase$_i$ is the reference phase difference corresponding to each reference pixel point, which indicates a reference distance between the preset reflective surface and the reference pixel point.

Furthermore, the size of the reference area of the photosensitive area, that is, the quantity k of the reference pixel points included in the reference area, can be adjusted flexibly according to a distance between the three-dimensional camera and the preset reflective surface. For example, a shorter distance between the three-dimensional camera and the preset reflective surface indicates a larger k.

In step 1430, according to a target distance between a target pixel point in the photosensitive area and the preset reflective surface, a target phase difference corresponding to the target pixel point is calculated.

The target pixel point is any pixel point among all pixel points in the photosensitive area.

Figure 6:
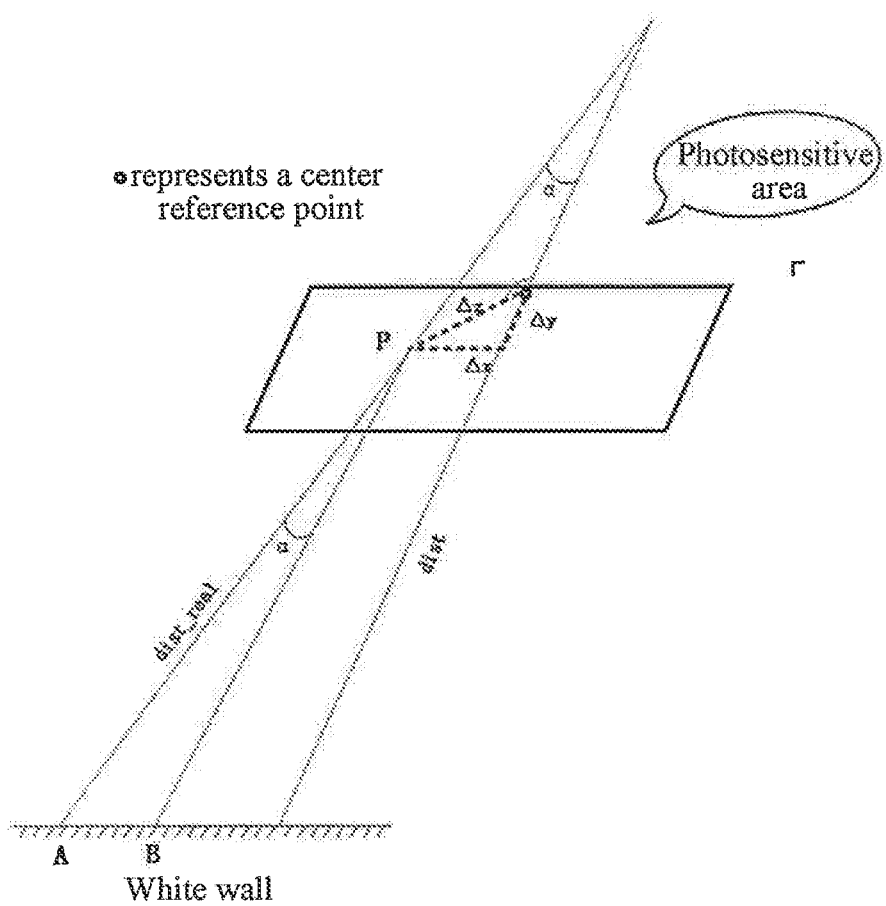
FIG. 6 is a schematic diagram of a specific implementation of calculating a target distance corresponding to a target pixel point in an application scenario.

Because a distance between a pixel point located in a marginal area of the photosensitive area and the to-be-tested object is not completely the same as a distance between a pixel point located in a center area of the photosensitive area and the to-be-tested object, a distance between any target pixel point in the photosensitive area and the preset reflective surface is not all consistent with a reference distance dist between the center reference point and the preset reflective surface. Therefore, the distance between the target pixel point and the preset reflective surface is defined as a target distance. As shown in FIG. 6, P is a target pixel point selected randomly in the photosensitive area, and P is also an image point corresponding to an object point A in the preset reflective surface, that is, a distance between P and the preset reflective surface is essentially a distance between P and the object point A.

Specifically, the target phase difference can be calculated by using the following formula:

phase_real=dist_real×max_phase/max_distance where phase_real is a target phase difference corresponding to the target pixel point, dist_real is a target distance between the target pixel point in the photosensitive area and the preset reflective surface, max_phase is a maximum phase of preset modulated light and max_distance is a maximum distance at which the three-dimensional camera can accurately photograph the to-be-tested object based on the maximum phase.

Furthermore, max_phase is related to a chip of an image sensor, and max_distance is related to a modulation frequency of the preset modulated light. That is, if the chip of the image sensor is different, max_phase is different, and if the modulation frequency of the preset modulated light is different, max_distance is also different. In other words, in different application scenarios, max_phase and max_distance can be flexibly adjusted according to the chip of the image sensor and the modulation frequency of the preset modulated light, to achieve an optimal effect of image calibration.

For example, as shown in Table 1, different modulation frequencies have different max_distance.

TABLE 1

Relationship between the modulation frequency and max_distance

| Modulation frequency | max_distance |
|---|---|
| 20.00 MHz | 7.5 m |
| 10.00 MHz | 15 m |
| 5.00 MHz | 30 m |
| 2.50 MHz | 60 m |
| 1.25 MHz | 120 m |

Furthermore, a phase of the preset modulated light is a periodic function that changes with time. Therefore, it is necessary to ensure that a reference distance between the center reference point and a preset emit surface is within a certain range, so that the calculated target phase difference of the preset modulated light corresponding to the calculated target pixel point is within the same period.

In step 1450, the obtained target phase difference is compared with the average reference phase difference to obtain a measurement deviation value corresponding to the target pixel point.

Specifically, a difference between the target phase difference corresponding to each target pixel point in the photosensitive area and the average reference phase difference is calculated, the difference being the measurement deviation value corresponding to the target pixel point. Further, the measurement deviation values of the target pixel points form the measurement deviation set of the three-dimensional camera.

Specifically, the measurement deviation value can be calculated by using the following formula:

$$\text{diff}[p] = \text{phase\_real} - \text{dif} f_{average}$$

where P represents any target pixel point in the photosensitive area, diff[p] represents a measurement deviation value corresponding to the target pixel point P, dif $f_{average}$ represents the average reference phase difference, and phase_real represents a target phase difference corresponding to the target pixel point P.

In step 1470, the measurement deviation value corresponding to the target pixel point is stored into the measurement deviation set.

A size and shape of the to-be-tested object cannot be predicted when the three-dimensional camera photographs the to-be-tested object. Therefore, the measurement deviation set includes the measurement deviation values of all the target pixel points in the photosensitive area. Therefore, the measurement deviation value corresponding to each target pixel point is stored into the measurement deviation set, so that when a to-be-tested object is photographed by using the three-dimensional camera subsequently, by determining a target pixel point corresponding to the to-be-tested object in the photosensitive area, a measurement deviation value corresponding to the target pixel point is obtained from the measurement deviation set conveniently to correct an image of the to-be-tested object.

Figure 3:
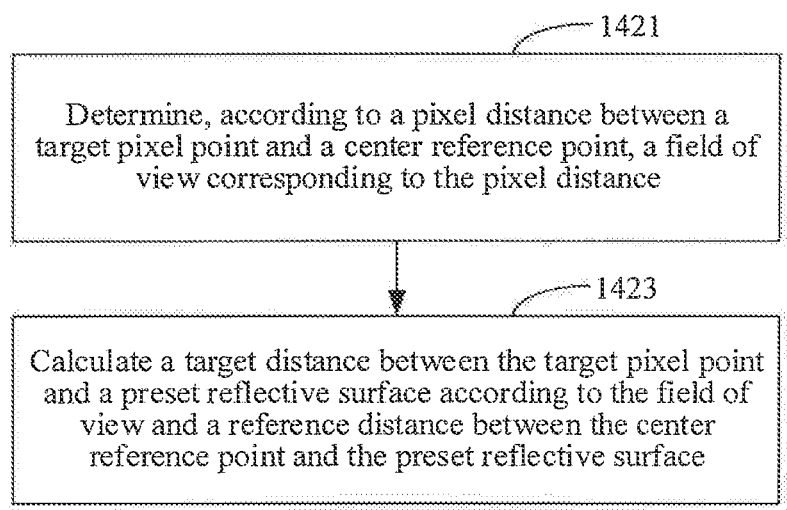
FIG. 3 is a flowchart of an image calibration method applied to a three-dimensional camera according to another exemplary embodiment.

FIG. 3 is a flowchart of an image calibration method applied to a three-dimensional camera according to another exemplary embodiment. As shown in FIG. 3, the method includes:

In step 1421, according to a pixel distance between a target pixel point and a center reference point, a field of view corresponding to the pixel distance is determined.

The center reference point represents a reference pixel point at a center position in the reference area.

The pixel distance is the quantity of pixel points between a certain pixel point in a pixel matrix and the center reference point. For example, a pixel matrix that forms a photosensitive area is matrix with a length of 320 and a width of 240. Then, a diagonal length of the pixel matrix is 400. In this case, a pixel distance corresponding to pixel points at four vertex angles of the pixel matrix is 200, that is, the pixel points at the four vertex angles are each 200 pixel points away from the center reference point.

Specifically, if the size of a field of view corresponding to two adjacent pixel points, that is, a unit field of view, is known and the pixel points in the pixel matrix are distributed evenly, the field of view corresponding to the pixel distance can be calculated according to the pixel distance between the pixel point and the center reference point.

In step 1423, according to the field of view and a reference distance between the center reference point and a preset reflective surface, a target distance between the target pixel point and the preset reflective surface is calculated.

The target distance can be calculated by using the following formula:

$$\text{dist\_real} = \text{dist}/\cos \alpha$$

where dist_real is the target distance, dist is the reference distance between the center reference point and the preset reflective surface, and cos α is the field of view.

Figure 4:
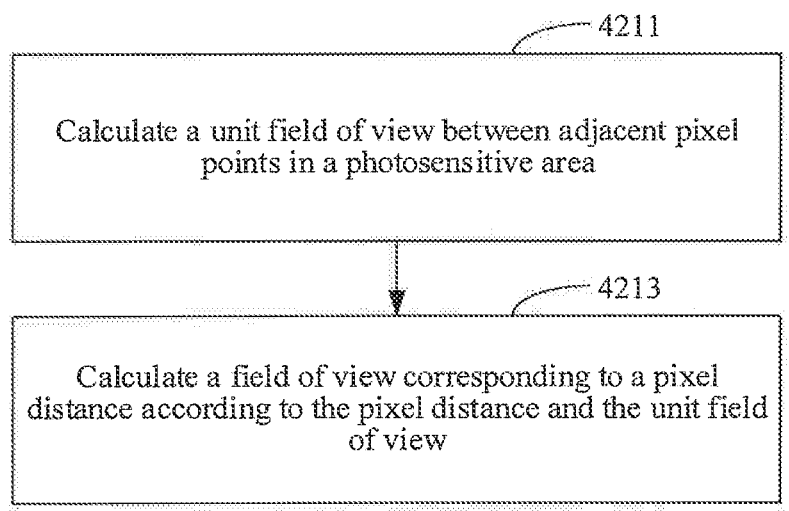
FIG. 4 is a flowchart of step 1421 in an embodiment according to the embodiment corresponding to FIG. 3.

FIG. 4 is a flowchart of step 1420 in an embodiment according to the embodiment corresponding to FIG. 3. As shown in FIG. 4, the process includes:

In step 4211, a unit field of view between adjacent pixel points in the photosensitive area is calculated.

Specifically, when a focal length of the three-dimensional camera is determined, the unit field of view between adjacent pixel points in the photosensitive area is only related to a distance between the adjacent pixel points.

In a specific embodiment, the photosensitive area of the three-dimensional camera is a pixel matrix with a length of 320 and a width of 240. The field of view between adjacent pixels can be calculated by using the following formula:

$$\theta = \text{FOV}(180*n)\text{rad/pixel},$$

where n represents the quantity of pixel points in a row in the pixel matrix that forms the photosensitive area. For the pixel matrix with a length of 320 and a width of 240, n is 320, θ is the unit field of view, rad is a radian unit, and pixel represents a single pixel point.

In step 4213, a field of view corresponding to the pixel distance is calculated according to the pixel distance and the unit field of view.

Figure 7:
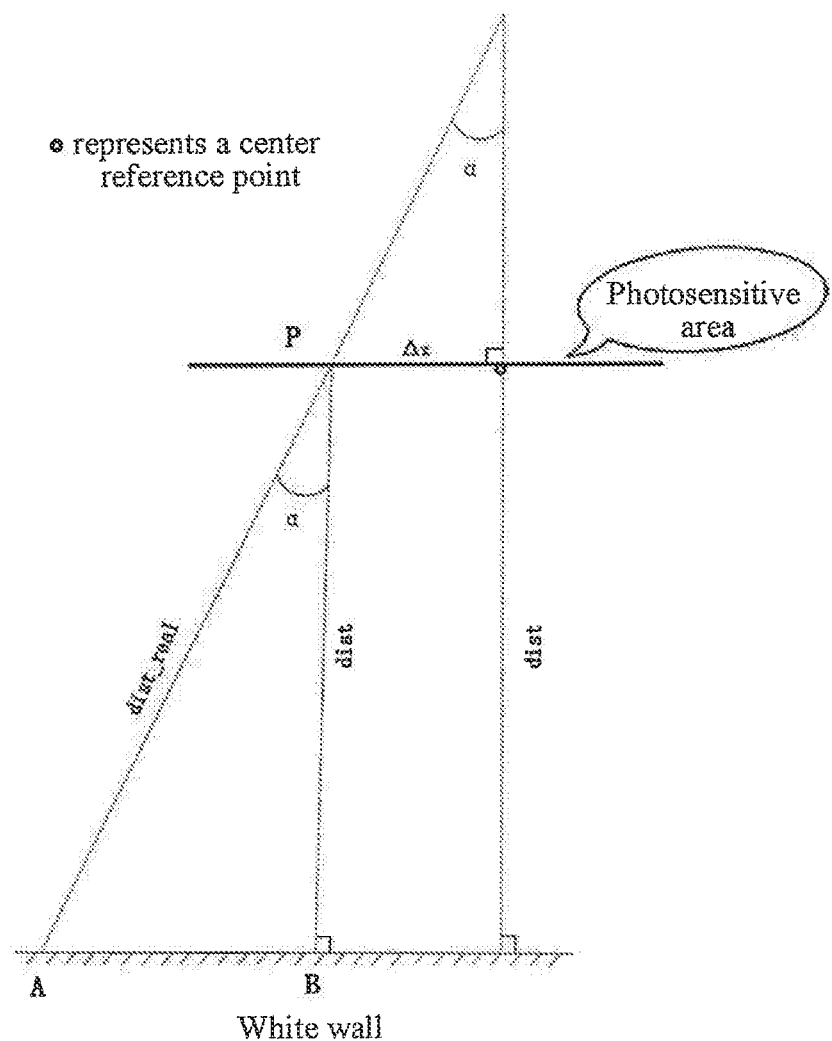
FIG. 7 is a schematic diagram of a specific implementation of calculating a pixel distance and a field of view.

As shown in FIG. 7, an object point on the preset reflective surface corresponding to a target pixel point P is A, and an object point on the preset reflective surface corresponding to the center reference point is B. A distance between the target pixel point P and the object point A is defined as a target distance, and a distance between the center reference point and the object point B is defined as a reference distance A pixel distance between the target pixel point P and the center reference point is $\Delta z$, a field of view corresponding to the pixel distance $\Delta z$ is $\alpha$, and the field of view corresponding to the pixel distance can be calculated by using the following formula:

$$\alpha = \Delta z * \theta \text{ rad}$$

where $\alpha$ represents the field of view, $\Delta z$ represents the pixel distance, $\theta$ represents the unit field of view, and rad is a radian unit.

In a specific implementation, a pixel distance corresponding to pixel points at four vertex angles of the pixel matrix is 200, that is, the pixel points at the four vertex angles are each 200 pixel points away from the center reference point. The calculated unit field of view is A radian units, and the field of view corresponding to the calculated pixel distance is 200 times of A radian units.

Figure 8:
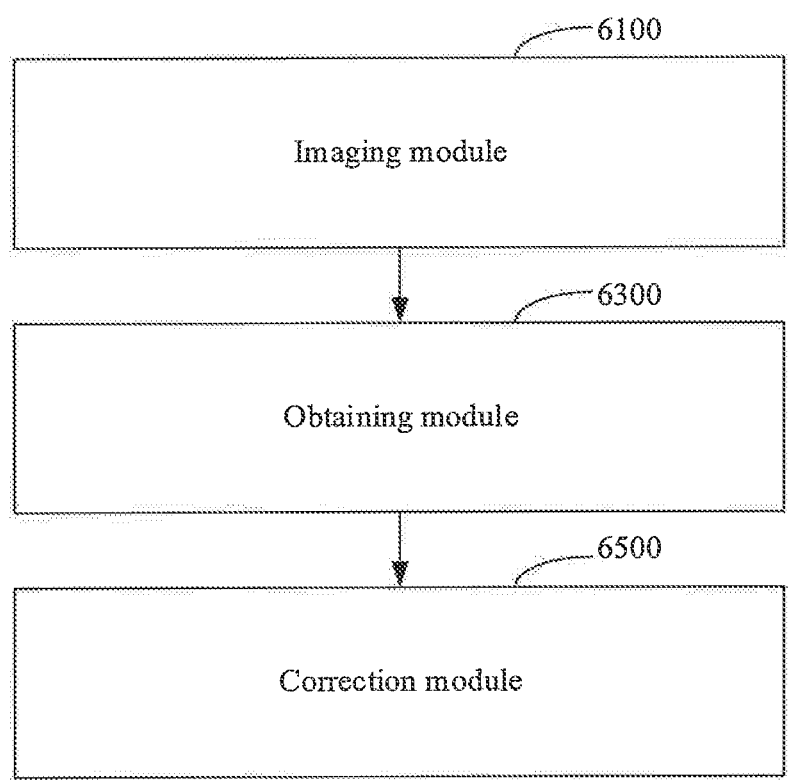
FIG. 8 is a block diagram of an image calibration apparatus applied to a three-dimensional camera according to an exemplary embodiment.

FIG. 8 is a block diagram of an image calibration apparatus applied to a three-dimensional camera according to an exemplary embodiment. As shown in FIG. 8, the apparatus includes but is not limited to: an imaging module 6100, an obtaining module 6300 and a correction module 6500.

The imaging module 6100 is configured to photograph a to-be-tested object by using the three-dimensional camera, obtain an image of the to-be-tested object in a photosensitive area of the three-dimensional camera, and determine a pixel point corresponding to the to-be-tested object in the photosensitive area according to the image of the to-be-tested object;

the obtaining module 6300 is configured to obtain, for the pixel point corresponding to the to-be-tested object, depth information corresponding to the pixel point, the depth information indicating a distance between the to-be-tested object and the pixel point; and the correction module 6500 is configured to obtain a measurement deviation value corresponding to the pixel point from a measurement deviation set stored in advance, and correct the depth information according to the measurement deviation value.

In an image calibration apparatus applied to a three-dimensional camera according to another exemplary embodiment, the apparatus further includes a calculation module, configured to calculate a phase difference of preset modulated light propagating between the pixel point and the to-be-tested object, and use the calculated phase difference as the depth information corresponding to the pixel point.

Figure 9:
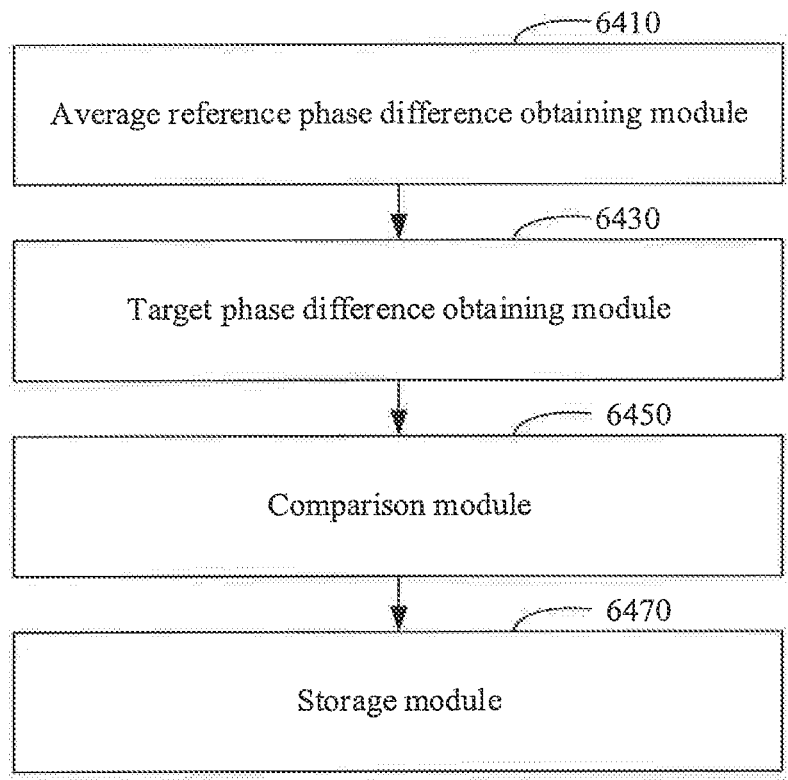
FIG. 9 is a block diagram of an image calibration apparatus applied to a three-dimensional camera according to another exemplary embodiment.

FIG. 9 is a block diagram of an image calibration apparatus applied to a three-dimensional camera according to another exemplary embodiment. As shown in FIG. 9, the apparatus includes but is not limited to: an average reference phase difference obtaining module 6410, a target phase difference obtaining module 6430, a comparison module 6450 and a storage module 6470.

The average reference phase difference obtaining module 6410 is configured to select a reference area from the photosensitive area, and calculate an average reference phase difference according to a reference phase difference corresponding to each reference pixel point in the reference area, the reference phase difference indicating a reference distance between a preset reflective surface and the reference pixel point;

the target phase difference obtaining module 6430 is configured to calculate, according to a target distance between a target pixel point in the photosensitive area and the preset reflective surface, a target phase difference corresponding to the target pixel point, where the target pixel point is any pixel point among all pixel points in the photosensitive area;

the comparison module 6450 is configured to compare the obtained target phase difference with the average reference phase difference to obtain a measurement deviation value corresponding to the target pixel point; and the storage module 6470 is configured to store the measurement deviation value corresponding to the target pixel point into the measurement deviation set.

Figure 10:
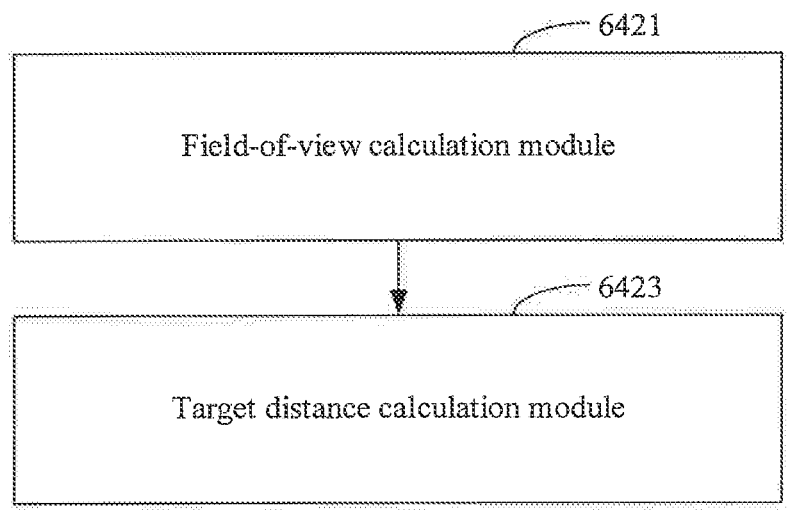
FIG. 10 is a block diagram of an image calibration apparatus applied to a three-dimensional camera according to another exemplary embodiment.

FIG. 10 is a block diagram of an image calibration apparatus applied to a three-dimensional camera according to another exemplary embodiment. As shown in FIG. 10, the cache module 630 includes but is not limited to: a field-of-view calculation module 6421 and a target distance calculation module 6423.

The field-of-view calculation module 6421 is configured to determine, according to a pixel distance between the target pixel point and a center reference point, a field of view corresponding to the pixel distance, the center reference point indicating a reference pixel point at a center position of the reference area; and the target distance calculation module 6423 is configured to calculate a target distance between the target pixel point and the preset reflective surface according to the field of view and a reference distance between the center reference point and the preset reflective surface.

Figure 11:
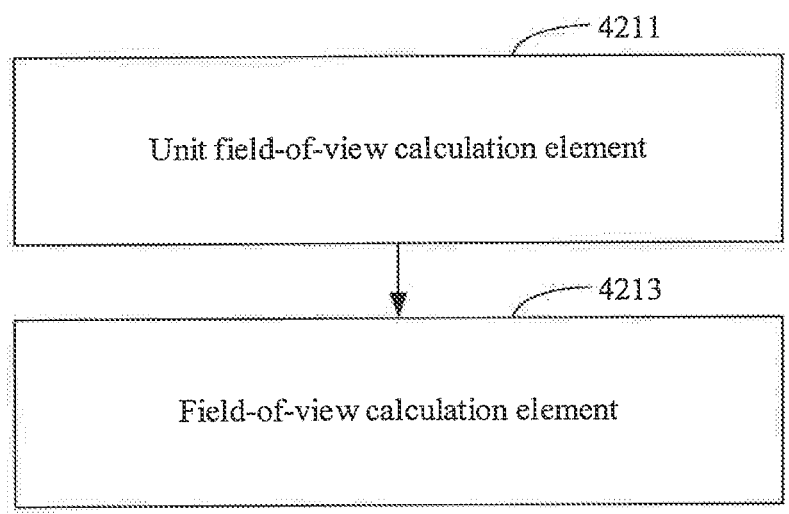
FIG. 11 is a block diagram of an embodiment of a field-of-view calculation element in the apparatus according to the embodiment corresponding to FIG. 10.

FIG. 11 is a block diagram of another embodiment of the field-of-view calculation module 6421 in the apparatus according to the embodiment corresponding to FIG. 10. As shown in FIG. 10, the field-of-view calculation module 6421 includes but is not limited to: a unit field-of-view calculation element 4211 and a field-of-view calculation element 4213.

The unit field-of-view calculation element 4211 is configured to calculate and obtain a unit field of view between adjacent pixel points in the photosensitive area; and the field-of-view calculation element 4213 is configured to calculate the field of view corresponding to the pixel distance according to the pixel distance and the unit field of view.

An embodiment of the present invention further provides an image calibration apparatus applied to a three-dimensional camera, including; at least one processor; and a memory communicatively connected to the at least one processor, where the memory stores an instruction executable by the at least one processor, and the instruction is executed by the at least one processor, so that the at least one processor performs the foregoing image calibration method applied to a three-dimensional camera.

It should be understood that the present invention is not limited to the precise structures described above and shown in the accompanying drawings, and various modifications and changes can be made without departing from the scope of the present invention. The scope of the present invention is limited only by the appended claims.

What is claimed is:

1. An image calibration method applied to a three-dimensional camera, wherein the method comprises:

photographing, by an image calibration apparatus, a to-be-tested object by using the three-dimensional camera, obtaining an image of the to-be-tested object in a photosensitive area of the three-dimensional camera, and determining a pixel point corresponding to the to-be-tested object in the photosensitive area according to the image of the to-be-tested object;

obtaining, by the image calibration apparatus, for the pixel point corresponding to the to-be-tested object, depth information corresponding to the pixel point, the depth information indicating a distance between the to-be-tested object and the pixel point; and obtaining, by the image calibration apparatus a measurement deviation value corresponding to the pixel point from a measurement deviation set stored in advance, and correcting the depth information according to the measurement deviation value;

wherein before the obtaining a measurement deviation value corresponding to the pixel point from a measurement deviation set stored in advance, and correcting the depth information according to the measurement deviation value, the method further comprises;

selecting, by the image calibration apparatus, a reference area from the photosensitive area, and calculating an average reference phase difference according to a reference phase difference corresponding to each reference pixel point in the reference area, the reference phase difference indicating a reference distance between a preset reflective surface and the reference pixel point;

calculating by the image calibration apparatus, according to t distance between a target pixel point in the photosensitive area and the reset reflective surface, a target phase difference corresponding to the target pixel point, the target pixel point being any pixel point among all pixel points in the photosensitive area;

comparing, the image calibration apparatus, the obtained target phase difference with the average reference phase difference to obtain a measurement deviation value corresponding to the target pixel point; and storing, by the image calibration apparatus, the measurement deviation value corresponding to the target pixel point into the measurement deviation set.

2. The method according to claim 1, wherein the obtaining, for the pixel point of the to-be-tested object, depth information corresponding to the pixel point comprises:

calculating, by the image calibration apparatus, a phase difference of preset modulated light propagating between the pixel point and the to-be-tested object, and using the calculated phase difference as the depth information corresponding to the pixel point.

3. The method according to claim 1, wherein the calculating an average reference phase difference according to a reference phase difference corresponding to each reference pixel point in the reference area comprises:

calculating, by the image calibration apparatus, a phase difference of preset modulated light propagating between each reference pixel point and the preset reflective surface, to obtain a reference phase difference corresponding to each reference pixel point; and calculating, by the image calibration apparatus, an average reference phase difference corresponding to all reference pixel points in the reference area according to the reference phase difference corresponding to each reference pixel point in the reference area.

4. The method according to claim 1, wherein before the calculating, according to a target distance between a target pixel point in the photosensitive area and the preset reflective surface, a target phase difference corresponding to the target pixel point, the method further comprises:

determining, by the image calibration apparatus, according to a pixel distance between the target pixel point and a center reference point, a field of view corresponding to the pixel distance, the center reference point indicating a reference pixel point at a center position of the reference area; and calculating, by the image calibration apparatus, the target distance between the target pixel point and the preset reflective surface according to the field of view and a reference distance between the center reference point and the preset reflective surface.

5. The method according to claim 4, wherein the determining, according to a pixel distance between the target pixel point and a center reference point, a field of view corresponding to the pixel distance comprises:

calculating, by the image calibration apparatus, a unit field of view between adjacent pixel points in the photosensitive area; and calculating, by the image calibration apparatus, according to the pixel distance and the unit field of view, the field of view corresponding to the pixel distance.

6. An image calibration apparatus applied to a three-dimensional camera, comprising: at least one processor; and a memory communicatively connected to the at least one processor, wherein the memory stores an instruction executable by the at least one processor, and the instruction is executed by the at least one processor, so that the at least one processor performs the image calibration method applied to a three-dimensional camera according to claim 1.

7. An image calibration apparatus applied to a three-dimensional camera, comprising: at least one processor; and a memory communicatively connected to the at least one processor, wherein the memory stores an instruction executable by the at least one processor, and the instruction is executed by the at least one processor, so that the at least one processor performs the image calibration method applied to a three-dimensional camera according to claim 3.

8. An image calibration apparatus applied to a three-dimensional camera, comprising: at least one processor; and a memory communicatively connected to the at least one processor, wherein the memory stores an instruction executable by the at least one processor, and the instruction is executed by the at least one processor, so that the at least one processor performs the image calibration method applied to a three-dimensional camera according to claim 4.

9. An image calibration apparatus applied to a three-dimensional camera, comprising: at least one processor; and a memory communicatively connected to the at least one processor, wherein the memory stores an instruction executable by the at least one processor, and the instruction is executed by the at least one processor, so that the at least one processor performs the image calibration method applied to a three-dimensional camera according to claim 5.

* * * * *